United States Patent
Yu et al.

(10) Patent No.: US 10,149,329 B2
(45) Date of Patent: Dec. 4, 2018

(54) ELECTRONIC DEVICE AND CONTROL METHOD THEREOF

(71) Applicant: SAMSUNG ELECTRONICS CO., LTD., Suwon-si, Gyeonggi-do (KR)

(72) Inventors: Chang-geun Yu, Bucheon-si (KR); Ki-hun Kim, Suwon-si (KR); Jin Lee, Suwon-si (KR); Kyeong-chae Lim, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 0 days.

(21) Appl. No.: 15/272,720

(22) Filed: Sep. 22, 2016

(65) Prior Publication Data

US 2017/0094704 A1   Mar. 30, 2017

(30) Foreign Application Priority Data

Sep. 25, 2015   (KR) ........................ 10-2015-0136719

(51) Int. Cl.
*H04W 76/02*   (2009.01)
*H04W 76/14*   (2018.01)
*H04W 8/00*    (2009.01)

(52) U.S. Cl.
CPC ......... *H04W 76/023* (2013.01); *H04W 76/14* (2018.02); *H04M 2203/252* (2013.01); *H04M 2250/74* (2013.01); *H04W 8/005* (2013.01)

(58) Field of Classification Search
CPC ........ H04M 1/66; H04W 12/00; H04W 12/06
See application file for complete search history.

(56) References Cited

U.S. PATENT DOCUMENTS

| | | | | |
|---|---|---|---|---|
| 7,788,492 | B2* | 8/2010 | Cam Winget | H04W 36/0088 713/168 |
| 2002/0010646 | A1* | 1/2002 | Azuma | G06Q 20/00 705/26.43 |
| 2003/0158612 | A1* | 8/2003 | Teraoka | H04M 3/493 700/49 |
| 2007/0071180 | A1* | 3/2007 | Kanada | G06F 21/316 379/39 |
| 2007/0147334 | A1 | 6/2007 | Guthrie | |
| 2008/0144827 | A1* | 6/2008 | Davis | H04K 1/00 380/270 |
| 2008/0243005 | A1* | 10/2008 | Jung | A61B 5/16 600/481 |

(Continued)

FOREIGN PATENT DOCUMENTS

| | | |
|---|---|---|
| JP | 5320456 | 10/2013 |
| KR | 10-2007-0009583 | 1/2007 |
| KR | 10-2013-0142394 | 12/2013 |
| KR | 10-2014-0051001 | 4/2014 |

*Primary Examiner* — Cindy Trandai
(74) *Attorney, Agent, or Firm* — Nixon & Vanderhye P.C.

(57) ABSTRACT

An electronic apparatus performing wireless peer-to-peer (wireless p2p) connection with an external device is provided. The electronic apparatus may include a communicator comprising communication circuitry, a microphone configured to receive a user voice input and a processor configured to control the communication circuitry to select the external device as a target device for the wireless p2p connection in response to the voice data received from the external device in a process of probing for the wireless p2p connection being consistent with voice data input through the microphone.

6 Claims, 10 Drawing Sheets

(56) References Cited

U.S. PATENT DOCUMENTS

| | | | |
|---|---|---|---|
| 2009/0082884 A1 | 3/2009 | Bonnat | |
| 2010/0099356 A1* | 4/2010 | Forrest | H04B 5/02 |
| | | | 455/41.2 |
| 2010/0227549 A1* | 9/2010 | Kozlay | H04L 9/0662 |
| | | | 455/26.1 |
| 2011/0025459 A1* | 2/2011 | Denison | G06Q 20/18 |
| | | | 340/5.51 |
| 2013/0148162 A1* | 6/2013 | Park | G06F 3/1296 |
| | | | 358/1.15 |
| 2013/0171965 A1* | 7/2013 | Schrecker | H04B 5/0006 |
| | | | 455/411 |
| 2013/0336161 A1 | 12/2013 | Jung | |
| 2014/0012587 A1* | 1/2014 | Park | H04W 12/06 |
| | | | 704/275 |
| 2014/0046664 A1* | 2/2014 | Sarkar | H04W 12/06 |
| | | | 704/246 |
| 2014/0112324 A1 | 4/2014 | Kwon | |
| 2014/0244044 A1 | 8/2014 | Davis et al. | |
| 2014/0373123 A1* | 12/2014 | Kang | H04L 41/22 |
| | | | 726/7 |
| 2015/0026580 A1* | 1/2015 | Kang | G06F 3/167 |
| | | | 715/728 |
| 2015/0244807 A1* | 8/2015 | Shoemake | H04L 67/125 |
| | | | 709/202 |
| 2015/0338912 A1* | 11/2015 | Kim | H04N 5/91 |
| | | | 345/520 |
| 2016/0218797 A1* | 7/2016 | Harrington | H04B 7/18597 |
| 2016/0232534 A1* | 8/2016 | Lacey | G06Q 20/38215 |
| 2017/0086098 A1* | 3/2017 | Kwon | H04W 28/22 |

\* cited by examiner

FIG. 1
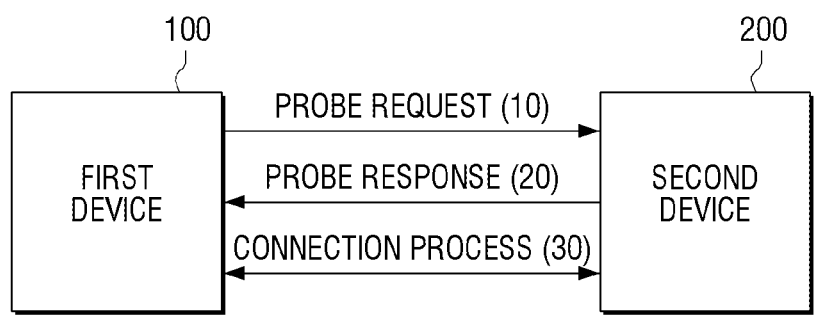
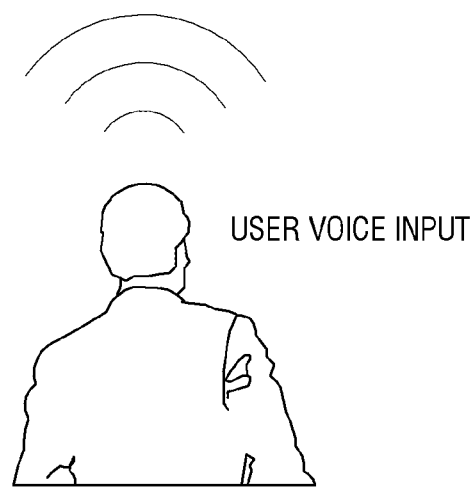

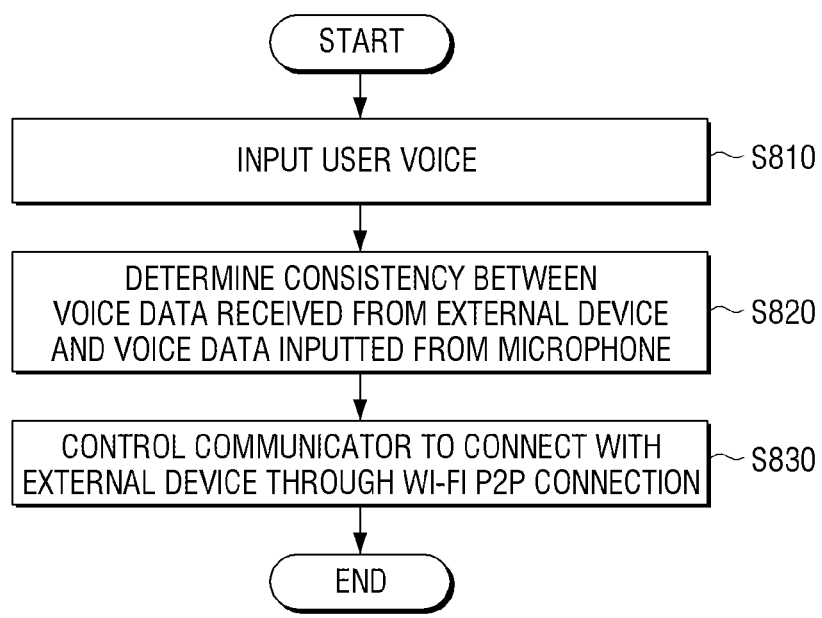

ELECTRONIC DEVICE AND CONTROL METHOD THEREOF

CROSS-REFERENCE TO RELATED APPLICATION

This application is based on and claims priority under 35 U.S.C. § 119 to Korean Patent Application No. 10-2015-0136719, filed in the Korean Intellectual Property Office on Sep. 25, 2015, the disclosure of which is incorporated by reference herein in its entirety.

BACKGROUND

1. Field

Aspects of the example embodiments relate generally to an electronic apparatus and a connecting method thereof and, for example, to an electronic apparatus which performs communication with an external device and a control method thereof.

2. Description of Related Art

Various forms of display apparatus have been developed as electronic technology advances. In particular, display apparatuses such as a TV, a PC, a laptop computer, a tablet, a cell phone, an MP3 player, and the like have been propagated to and used in most of households.

Recently, a variety of services have been supported through communication among a plurality of devices in order to meet the needs of a user who wants to use newer and more various services.

There have accordingly been diverse measures to perform communication connection among a plurality of devices. In general, a respective menu has been provided through a display screen. For instance, after a device probes other devices around a user, names of the devices detected are displayed on a display of the device. Then, a user selects a target device to which the device is connected among the names of the devices displayed, and communication connection is performed between the devices accordingly.

However, such wireless communication connection method has been considered as difficult in the case in which there are too many devices around a user or a name of a device around a user is set as a default value.

SUMMARY

An aspect of the example embodiments relates to an electronic apparatus which performs communication connection with an external device based on receiving a user voice input and a connecting method thereof.

According to an example embodiment, an electronic apparatus performing wireless peer-to-peer (wireless p2p) connection with an external device is provided, the electronic apparatus including a communicator comprising communication circuitry, a microphone configured to receive a user voice input and a processor configured to, in response to voice data received from an external device in the process of probing for the wireless p2p connection and voice data received through the microphone being consistent with each other, control the communication circuitry to select the external device as a target device for the wireless p2p connection.

For example, the processor may transmit a probe request, and control the communicator to receive a probe response from the external device in response to the probe request.

The processor may extract voice data from the probe response received from the external device, and in response to voice data received from an external device and voice data received through the microphone being consistent with each other, select the external device as a target device for the wireless p2p connection.

For example, at least one of the probe request and the probe response may include an identification information field, data length information and voice data.

The processor may, in response to the external device being selected as a target device for the wireless p2p connection, control the communicator to sequentially perform a group formation stage and an operation stage with the external device.

According to an example embodiment, a connection method performing the wireless p2p connection, including receiving a user voice input, determining whether voice data received from an external device in the process of probing for the wireless p2p connection and the received voice data being consistent with each other and selecting the external device as a target device for the Wi-Fi p2p connection.

For example, the connection method may further include transmitting a probe request and receiving a probe response from the external device in response to the probe request.

The connection method may further include extracting voice data from the probe response received from the external device, and, in response to the extracted voice data and the received voice data being consistent with each other, selecting the external device as a target device for the wireless p2p connection.

In the example above, at least one of the probe request and the probe response may include at least one of an identification information field, data length information and voice data.

The connection method may further include, in response to the external device being selected as a target device for the wireless p2p connection, sequentially performing a group formation stage and an operation stage with the external device.

According to the above-described various example embodiments, communication connection between devices is performed using a user voice input and thus, a user may manage various devices conveniently.

BRIEF DESCRIPTION OF THE DRAWINGS

The above and other aspects of the disclosure will become more readily apparent from the following detailed description, taken in conjunction with the accompanying drawings, in which like reference numerals refer to like elements, and wherein:

FIG. 1 is a diagram illustrating an example Wi-Fi p2p connection process between devices according to an example embodiment.

FIG. 8 is a flow chart illustrating an example Wi-Fi p2p connection method of an electronic apparatus according to an example embodiment.

DETAILED DESCRIPTION

Figure 2:
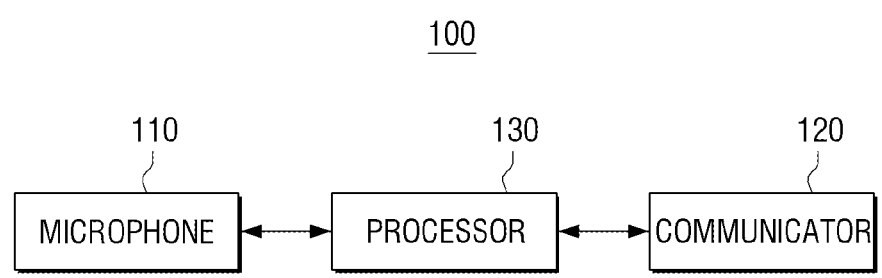
FIG. 2 is a block diagram illustrating an example configuration of an electronic apparatus according to an example embodiment.

In the following description and claims, a term including an ordinal, such as, 'first,' 'second,' or the like, may be used to distinguish elements. The ordinal is used to distinguish the same or similar elements and does not limit the meaning of the term. For instance, ordinals do not affect an order of use or an order of arrangement of elements expressed with the ordinals. Respective ordinals may be replaced with each other, if necessary.

A term in a singular form includes a plural form unless it is intentionally written that way. In the following description, a term, such as, 'include,' 'consist of,' or the like, refers to the disclosed features, numbers, steps, operations, elements, parts, or combinations thereof and is not intended to exclude any possibilities of existence or addition of one or more other features, numbers, steps, operations, elements, parts, or combinations thereof.

Hereinafter, example embodiments will be described in more detail with reference to the accompanying drawings.

FIG. 1 is a diagram illustrating an example Wi-Fi p2p connection process between devices according to an example embodiment.

Wi-Fi p2p connection is initiated by a user voice input. In order to do this, a user may set target devices for Wi-Fi p2p connection to a voice input mode.

For example, a user may set a first device 100 and a second device 200 to a voice input mode. For example, a voice input mode may be set by turning on the first device 100 and the second device 200, or by pushing a button which is separately equipped in the first device 100 and the second device 200.

When a user voice for Wi-Fi p2p connection is recognized by the first device 100 and the second device 200, the first device 100 and the second device 200 scan a wireless communication channel around a user.

For example, the first device 100 transmits a probe request 10 based on the channel found. The second device 200 which received the probe request 10 transmits a probe response 20 corresponding to the probe request 10 to the first device 200 through the channel.

The first device 100 which received a probe response 20 compares user voice data included in a probe response frame and user voice data received from a microphone of the first device 100. If the two data are consistent with each other, the first device selects the second device 200 as a target device for Wi-Fi p2p connection, and performs a connection process 30.

The second device 200 which received a probe request 10 compares user voice data included in a probe request frame and user voice data received from a microphone of the second device 200. If the two data are consistent with each other, the second device 200 selects the first device 100 as a target device for Wi-Fi p2p connection, and performs a connection process.

For example, the second device 200 may also transmit a probe request first, and also the first device 100 may send a probe response in response to the probe request 10 of the second device 200.

Hereinafter, example configurations and operations of the first device 100 and the second device 200 will be described in greater detail.

FIG. 2 is a block diagram illustrating an example configuration of an electronic apparatus 100 according to an example embodiment.

The electronic apparatus 100 illustrated in FIG. 2 may be implemented by the first device 100 and the second device 200.

According to FIG. 2, the electronic apparatus 100 may include a microphone 100, a communicator (e.g., including communication circuitry) 120 and a processor 130.

The microphone 110 may receive a user voice input. For example, a microphone 110 may be equipped in the electronic apparatus 100, or may be equipped in an external device connected to the electronic apparatus 100. The external device may be, for example, earphones or a remote control wirelessly connected with TV, or the like, but is not limited thereto.

A communicator 120 may include various communication circuitry for performing communication with the external device according to a predetermined communication standard.

For instance, the communicator 120 may include various communication circuitry, such as, for example, and without limitation, more than one of Wi-Fi, Bluetooth, ZigBee and Z-wave and the like, and perform communication according to a communication method of a respective communication module.

The processor 130 is configured to control an overall operation of the electronic apparatus 100.

For example, the processor 130 performs a function for wireless communication connection with the external device. Here, Wi-Fi p2p will be described as an example of wireless communication method between devices. However, in addition to the Wi-Fi p2p, any wireless communication method between devices by which voice data can be included in a probe packet (or a probe query) may be applied to this example embodiment.

In the example in which a user utters a certain voice for Wi-Fi p2p connection, the processor 130 performs a voice recognition. For example, a processor 130 compares consistency between a voice command pre-stored in a storage (not illustrated) and a voice inputted through the microphone 110. If the consistency is greater than a predetermined consistency, the processor 130 may recognize the voice input through a microphone and received from the microphone as a predetermined voice command. For example, if it is said that a voice command such as "P2p connection, please," is stored in the storage (not illustrated) as a command for Wi-Fi p2p connection, and when a user actually utters "P2p connection, please," a processor 130 may determine consistency between a plurality of voice commands stored in the storage (not illustrated) and "P2p connection, please," uttered by a user. Consequently, the consistency between "P2p connection, please," which is one of the predetermined voice commands and "P2p connection, please," which a user actually uttered is greater than a predetermined value, the processor 130 determines that the voice of "P2p connection, please," has been recognized.

When a user command for commanding Wi-Fi p2p connection is recognized, the processor 130 proceed with a Wi-Fi p2p connection process.

For example, the Wi-Fi p2p connection process may include, for example, a scanning stage, a finding stage, a formation stage and an operation stage.

A scanning stage is for searching a channel to find a target device for Wi-Fi p2p connection.

A finding stage is for searching a target device for Wi-Fi p2p connection using the channel found in the scanning stage.

The processor 130 may, in response to voice data received from an external device in the process of probing for Wi-Fi p2p connection and voice data inputted through the microphone being consistent with each other, control the communicator 120 to select the external device as a target device for Wi-Fi p2p connection.

For example, the processor 130 may transmit a probe request, and receive a probe response from the external device in response to the probe request. At least one of the probe request and prove response includes at least one of an identification information field, data length information and voice data. A probing stage in relation to a probe request and a probe response will be described in detail with reference to FIG. 3.

Figure 3:
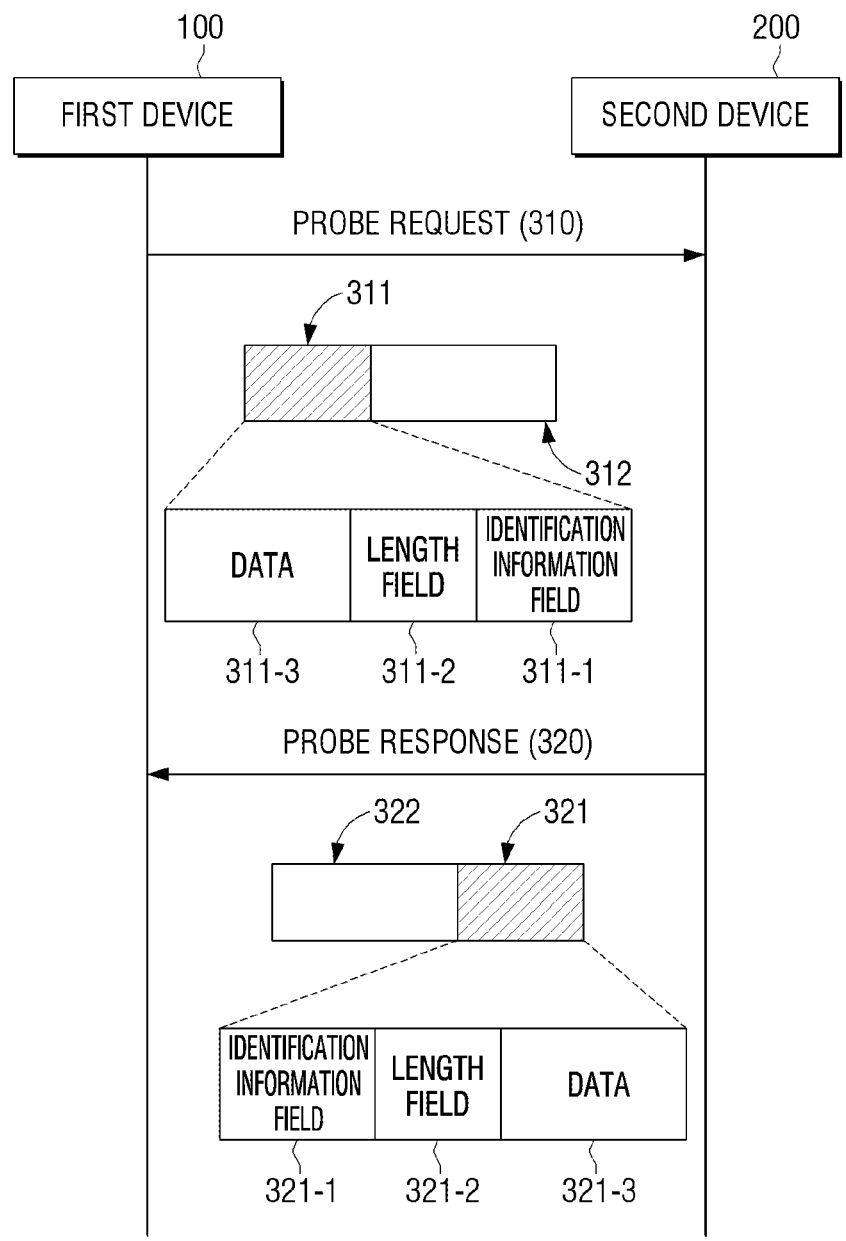
FIG. 3 is a diagram illustrating an example probing stage in Wi-Fi p2p connection process according to an example embodiment.

FIG. 3 is a diagram illustrating an example probing stage in the Wi-Fi p2p connection process according to an example embodiment.

According to FIG. 3, in the Wi-Fi p2p connection process, the processor 130 of the first device 100 sends a probe request 310 to the second device 200 using a channel found.

For example, in a probe request frame 312, an MAC address of a second device 200, an MAC address of a first device 100, a probing sequence, probing time and so on may be inserted.

An IE 311 may comprise an identification information field 311-1, a length field 311-2 and a data field 311-3. In the identification information field 311-1, a data code and vendor identification information inserted in the data field 311-3 may be inserted. Further, a data length of the IE 311 may be inserted in the length field 311-2, and user voice data inputted in the second device 200 may be inserted in the data field 311-3.

In response to the probe request 310 of the processor 130, the second device 200 may transmit a probe response 320. For example, the second device 200 may use a probe response frame 322 for the probe response 320, and the IE 321 may be inserted in the probe response frame 322. For example, a description regarding the IE 321 inserted in the probe request frame 322 is overlapped with the description regarding the IE 311 inserted in the prove request frame 312 described above, and therefore, a detailed description will be omitted.

The processor 130, in response to the probe response frame 322, extracts the IE 321 from the probe response frame 322. For example, the processor 130 may extract data 321-3 using information inserted in the identification information field 321-1 and the length field 321-2 of the IE 321. Here, the data may be voice data.

The processor 130 compares voice data extracted from the probe response frame 322 and user voice data inputted through (received from) the microphone 110 of the first device 100, and determines consistency between the data. For instance, the voice data extracted from the probe response frame 322 corresponds to "P2p connection, please," and also the voice data extracted from the microphone 110 of the first device 100 corresponds to "P2p connection, please," the processor 130 may determine that the voice data are consistent with each other.

The processor 130 extracts voice data from the probe response 320 received from an external device, and in the case in which the voice data extracted and the voice data inputted through the microphone are consistent with each other, the processor 130 selects the external device as a target device for Wi-Fi p2p connection.

The processor 130 may, in response to an external device being selected as a target device for Wi-Fi p2p connection, control the communication circuitry of the communicator 120 to sequentially perform the group formation stage and the operation stage with the external device.

The group formation stage may be a stage for forming a BSS (Basic Service Set) among target devices for Wi-Fi p2p connection. In order to form the BSS, the target devices may proceed with a GO (Group Owner) stage and a WPS (Wi-Fi Protected Setup) stage.

For example, the GO negotiation stage is a stage for dividing roles of a p2p GO or a p2p client among target devices for p2p connection. Further, an operation channel is set in the GO negotiation stage.

In the WPS stage, exchange of pin information or a brief setup operation using a push button may be implemented. However, in the example embodiment, a WPS stage may be skipped as a counterpart device is authenticated through user voice data.

In the operation stage, a general communication with the counterpart device connected through Wi-Fi p2p connection is performed.

According to the Wi-Fi p2p connection described above, even though a plurality of external devices may be found, the rest of the devices except for a device which has received a user voice input through a voice receiving mode may be excluded in the connection process. In other words, because a target device for Wi-Fi p2p connection is automatically selected and connected through a user voice, a user may readily use Wi-Fi p2p connection for devices that a user wants to connect.

Figure 4:
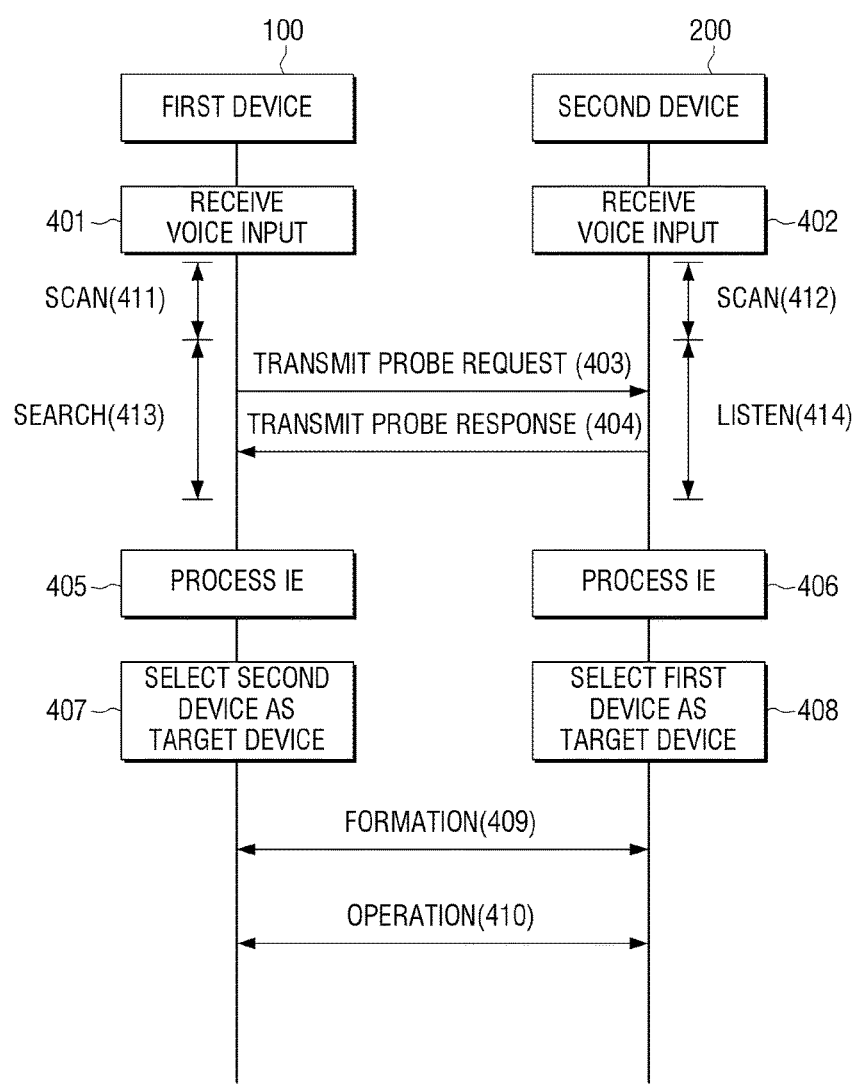
FIG. 4 is a timing chart illustrating an example Wi-Fi p2p connection process according to an example embodiment.

FIG. 4 is a timing chart illustrating an example Wi-Fi p2p connection process according to an example embodiment.

The first device 100 and the second device 200 receive a user voice input 401, 402, respectively. The first device 100 and the second device 200 scan a channel separately 411, 412. After scanning a channel, the first device 100 transmits a probe request 403 in a search state 413, and the second device 200 transmits 404 a probe response in response to the probe request in a listen state 414.

The first device 100 which received the probe response extracts an IE from a probe response packet, and determines 405 consistency by, for example, comparing the IE with voice data input through (e.g., received from) the microphone of the first device 100. If the two data are consistent with each other, the second device 200 is selected as a target device.

The second device 200 which received a probe request extracts an IE from a probe request packet 406, and determines consistency by comparing the IE with voice data inputted through the microphone of the second device 200. If the two data are consistent with each other, the first device 100 is selected as a target device.

The first device 100 and the second device 200 select each other as a target device, the first device 100 and the second device 200 exchange information with each other, and after performing the formation stage 409, exchange target data with each other (the operation stage 410).

Figure 5:
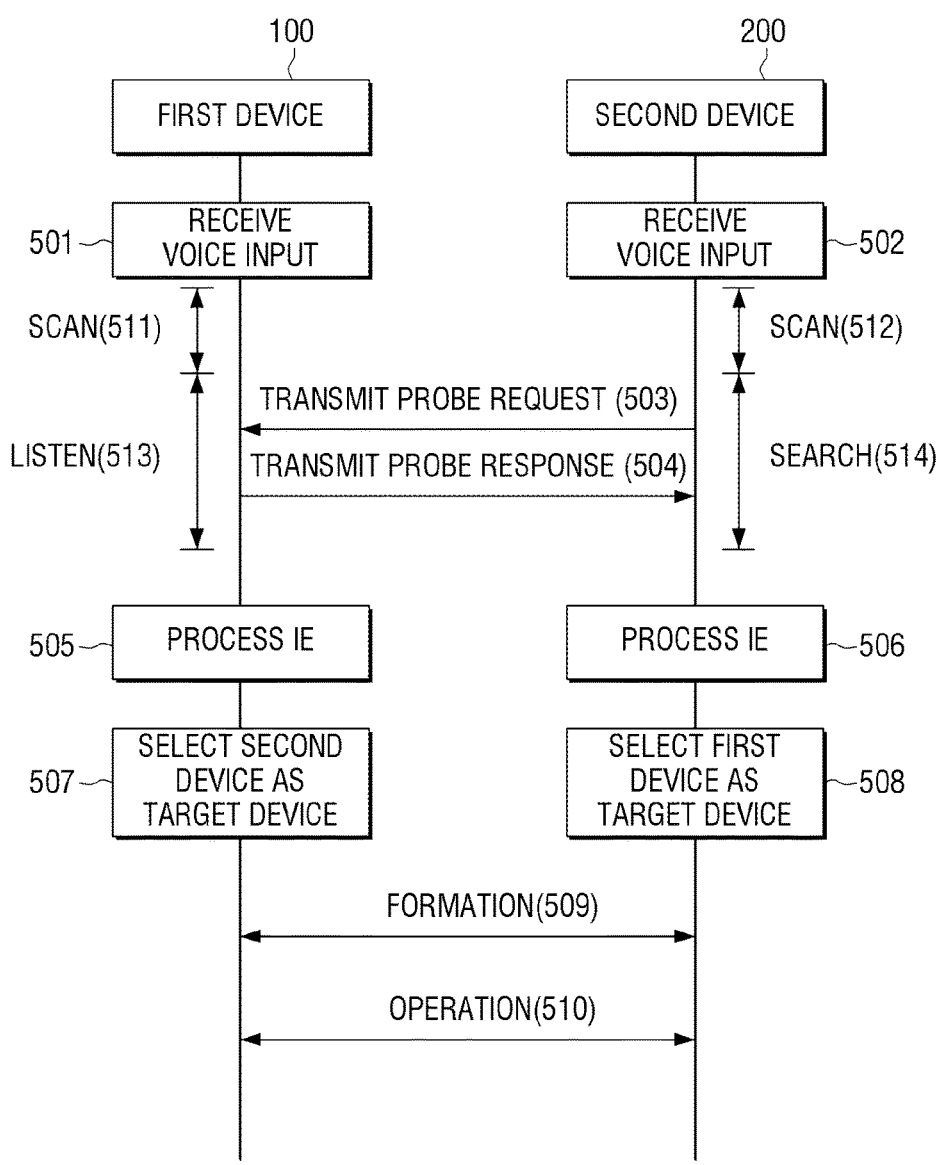
FIG. 5 is a timing chart illustrating an example Wi-Fi p2p connection process according to another example embodiment.

FIG. 5 is a timing chart illustrating an example Wi-Fi p2p connection process according to an example embodiment.

The first device 100 and the second device 200 receive a user voice input 501, 502, respectively. The first device 100 and the second device 200 scan 511, 512 a channel separately. After scanning a channel, the second device 200 transmits a probe request 503 in a search state 514, and the first device 100 transmits a probe response 504 in response to the probe request in a listen state 513.

The second device 200 which received the probe response extracts an IE from a probe response packet 506, and determines consistency by comparing the IE with voice data inputted through the microphone of the second device 200. If the two data are consistent with each other, the second device 200 is selected 506 as a target device.

The first device 100 which received the probe request extracts an IE from a probe response packet 505, and determines consistency by comparing the IE with voice data inputted through the microphone of the first device 100. If the two data are consistent with each other, the second device 200 is selected 507 as a target device.

The first device 100 and the second device 200 select each other as a target device, the first device 100 and the second device 200 exchange information with each other, and after performing the formation stage 509, exchange target data with each other (the operation stage 510).

Figure 6A:
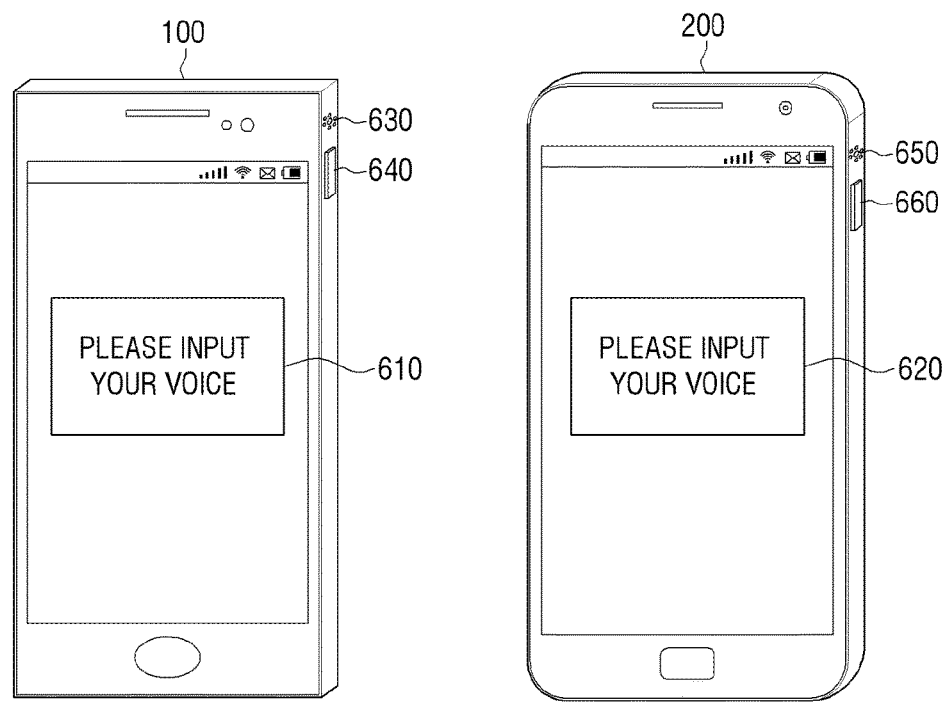
FIGS. 6A, 6B and 6C are diagrams illustrating an example in which a first device and a second device are cellphones according to an example embodiment.
Figure 6B:
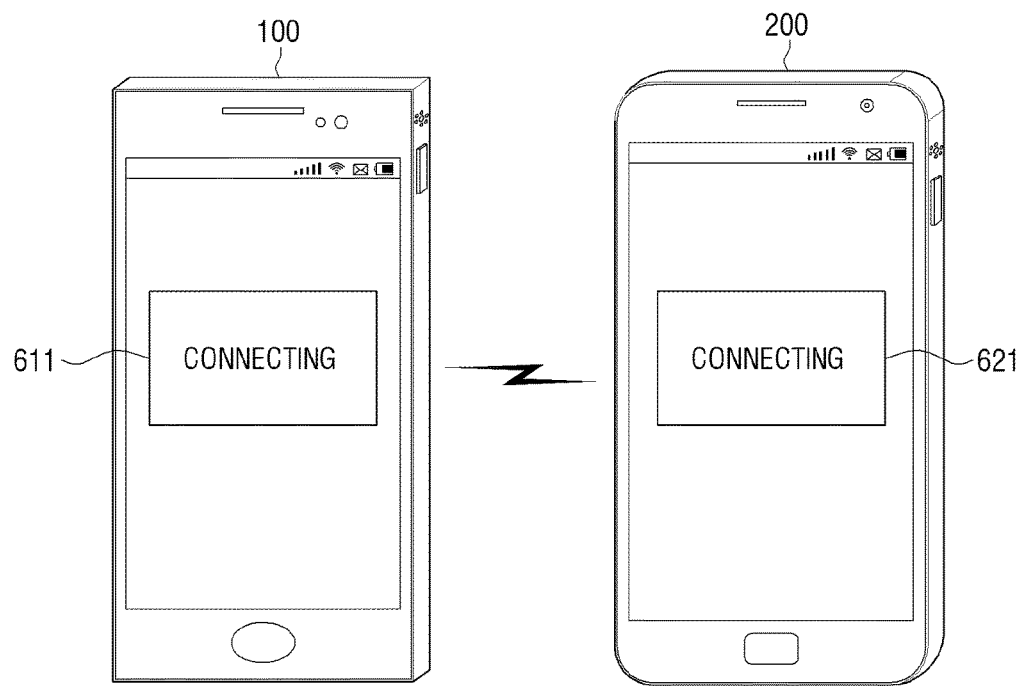
Figure 6C:
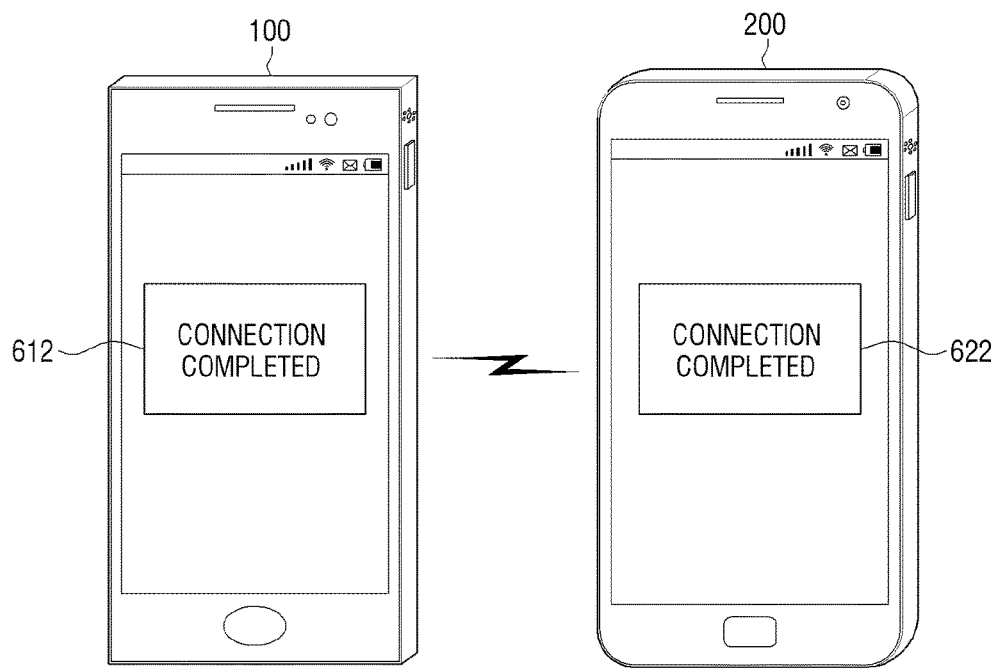

FIGS. 6A, 6B and 6C are diagrams illustrating an example in which the first device 100 and the second device 200 are cellphones according to an example embodiment.

According to FIG. 6A, when voice input buttons 640, 660 equipped in the first device 100 and the second device 200, respectively, are pushed, a message "Please input your voice," 610, 620 may be displayed on the first device 100 and the second device 200. For example, a user may utter a voice through microphones 630, 650 equipped in the first device 100 and the second device 200.

In FIG. 6B, in response to a user voice input, the first device 100 and the second device 200 connect with each other through a probe request and a probe response. For example, a message "Connecting," 611, 621 may be displayed on the first device 100 and the second device 200.

FIG. 6C is a diagram illustrating a completed state of Wi-Fi p2p connection between the first device 100 and the second device 200. For example, a message "Connection Completed," 612, 622 may be displayed on the first device 100 and the second device 200.

In the example embodiment described above, the example of the first device 100 and the second device 200 is a cellphone, but the first device 100 and the second device 200 may be a TV, an audio device, a washing machine, a refrigerator, a robotic vacuum cleaner etc. besides a cellphone.

Figure 7:
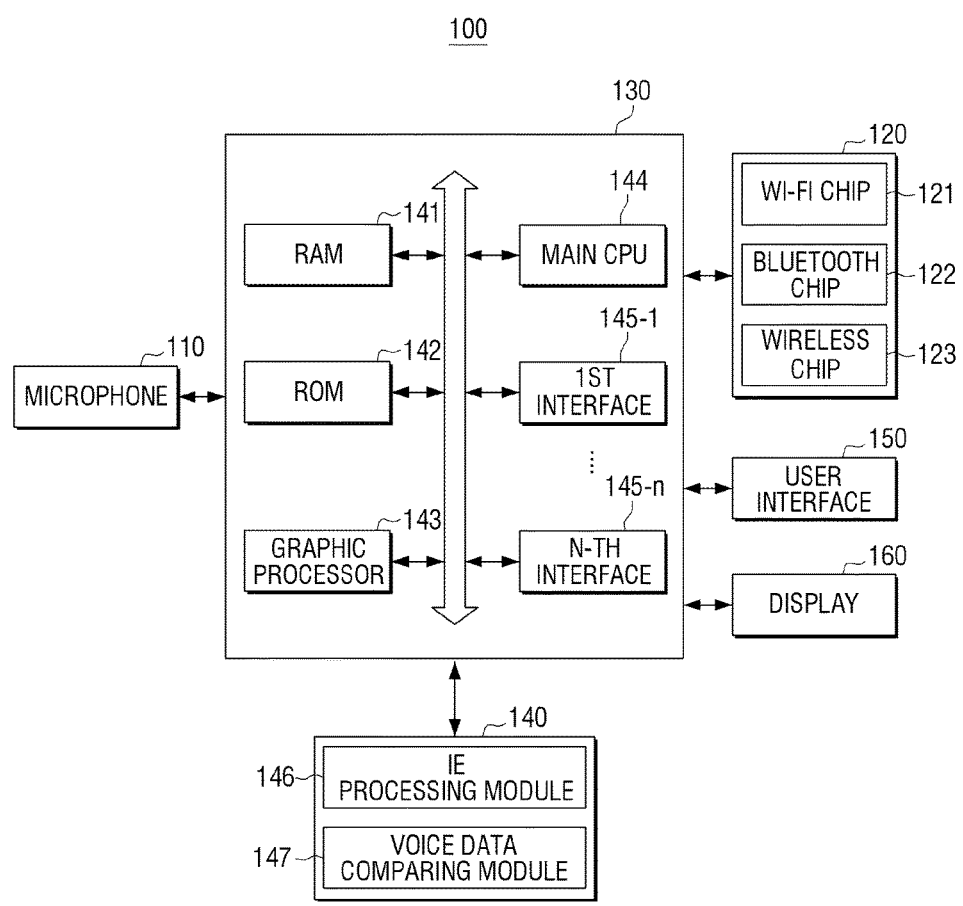
FIG. 7 a block diagram illustrating an example configuration of an electronic apparatus according to an example embodiment.

FIG. 7 is a block diagram illustrating an example configuration of the electronic apparatus 100 according to an example embodiment. In FIG. 7, a detailed description for overlapped elements illustrated in FIG. 2 and in FIG. 3 will be omitted. Also, configuration elements illustrated in FIG. 7 may be partly omitted or changed, and other elements may be added.

The microphone 110 receives a user voice input.

The communicator 120 includes various communication circuitry, and is configured to communicate with various types of external devices according to various types of communication methods.

For example, the communicator 120 transmits a probe request generated by the processor 130 to an external device, and performs a function to receive a probe response transmitted from the external device. The communicator 120 includes various communication circuitry, such as, for example, and without limitation, communication chips such as a Wi-Fi chip 121, a Bluetooth chip 122, a wireless communication chip 123 and the like, but is not limited thereto.

The Wi-Fi chip 121 and the Bluetooth chip 122 perform communication by a Wi-Fi method and a Bluetooth method, respectively. The wireless communication chip 123 may be a chip performing communication according to various communication standards such as IEEE, ZigBee, 3rd Generation (3G), 3rd Generation Partnership Project (3GPP), Long Term Evolution (LTE) and the like. The processor 120 may further include an NFC chip operating by a Near Field Communication (NFC) method which uses a 13.56 MHz bandwidth among various RF-ID frequency bandwidths such as 135 kHz, 13.56 MHz, 433 MHz, 860~960 MHz, 2.45 GHz and the like.

The processor 130 controls overall operation of the electronic device 100 using various programs stored in a storage (140).

As an example, the processor 130 may execute an application stored in the storage 140, and form and display an execution screen, and may also play various content stored in the storage 140. Further, the processor 130 may communicate with the external devices through the communication circuitry of the communicator 120.

The processor 130 includes a RAM (141), a ROM (142), a graphic processor (143), a main CPU (144), 1st to n-th interfaces (145-1~145-n) and a bus (146).

The RAM (141), the ROM (142), the graphic processor (143), the main CPU (144) and the 1st to the n-th interfaces (145-1~145-n) may be connected to one another through the bus (146).

The 1st to the n-th interfaces (145-1~145-n) are connected to various configuration elements described above. One of the interfaces may be a network interface that is connected to an external device through a network.

The main CPU 144 is accessed to the storage 140, and booted up using an Operating System (OS) stored in the storage 140. In addition, the main CPU 144 performs various operations using various programs, content, data etc. stored in the storage 140.

In the ROM 142, a set of commands for system booting etc. is stored. When a power is supplied in response to a turn-on command, the main CPU 144 copies the OS stored in the storage 140 to the RAM 141 according to a command stored in the ROM 142, and boots up a system by executing the OS. When the booting is completed, the main CPU 144 copies various application programs stored in the storage 140 to the RAM 141, and executes the application program copied and performs various operations.

The graphic processor 143 generates a screen including various objects such as an icon, an image, text, etc. using an arithmetic unit (not illustrated) and a rendering unit (not illustrated). The arithmetic unit, using a control command received from an input device, calculates attribute values such as a coordinate value, a shape, a size, a color etc. upon which each object is to be displayed according to a layout of a screen. The rendering unit generates a screen having various layouts including an object based on the attribute value calculated in the arithmetic unit. The screen generated in the rendering unit is displayed inside a display area of a display 160.

In the storage 140, data and a program for operating the electronic apparatus 100 may be stored.

In particular, in the storage 140, an IE processing module 146 and a voice data comparing module 147 may be stored. Here, an IE is data regarding certain information transmitted by being inserted in a probe response and a probe request. The processor 130 may insert IE data in a probe request frame, or extract IE data from a probe response frame using the IE processing module 146. Further, the processor 130 may determine consistency between voice data inputted from the microphone 110 and voice data extracted from a probe request frame or a probe response frame received from an external device using the voice data comparing module 147.

In the storage 140, various data may be stored such as an Operating System (OS) software module for operating the electronic apparatus 100, various applications, various data which is inputted or set while an application is executed, content and the like.

For instance, in the storage 140, a base module (not illustrated) which processes a signal transmitted from each hardware included in the electronic apparatus 100 and transmits the signal to a higher layer module, a communication module (not illustrated) for performing various communications and the like may be stored.

Further, in the storage 140, information related to communication connection with an external device such as previous Wi-Fi p2p connection information and the like may be stored.

A user interface 150 receives various user commands.

The user interface 150 may receive a user command for turning on a power of the electronic apparatus 100. The user interface 150 may be implemented by a remote control signal receiver, a mechanical button formed in a transitory area on the front side or the lateral side or the rear side of an external surface of a main unit, a touch pad, a wheel and the like. For instance, the user interface 150 may receive a remote control signal corresponding to a user command for turning ON/OFF a power of the electronic apparatus 100.

The display 160 displays various screens. For example, a screen may include an application execution screen including various objects such as an image, a video, text etc. and a GUI screen and the like.

FIG. 8 is a flowchart illustrating an example Wi-Fi p2p connection method according to an example embodiment.

According to the Wi-Fi p2p connection method of the electronic apparatus 100 illustrated in FIG. 8, when a user voice is input S910, it is determined that voice data received from an external device in the probing process for Wi-Fi p2p connection and voice data inputted or received from a microphone are consistent with each other, and may control a communicator to select the external device as a target device for Wi-Fi p2p connection.

For example, the connection method may further include transmitting a probe request, and receiving a probe response from an external device in response to the probe request.

Further, the connection method may further include extracting voice data from the probe response received from the external device and, in response to the extracted voice data and voice data inputted to and/or received through a microphone are consistent with each other, selecting the external device as a target device for Wi-Fi p2p connection.

For example, at least one of the probe request and the probe response may include at least one of an identification information field, data length information and voice data.

The connection method may further include, in response to the external device being selected as a target device for the Wi-Fi p2p connection, controlling the communication circuitry of the communicator to sequentially perform a group formation stage and an operation stage with the external device.

Meanwhile, the methods according to the various example embodiments may be programmed as a software and equipped in the electronic apparatus 100.

For example, according to an example embodiment, a non-transitory computer readable medium which performs receiving a user voice input and controlling the communicator to select the external device as a target device for the Wi-Fi p2p connection in response to voice data received from an external device in the process of probing for the Wi-Fi p2p connection and voice data inputted through the microphone being consistent with each other may be installed.

A non-transitory computer readable medium semi-permanently stores data, and can perform a reading through a device. For example, the various applications and programs described above may be stored in and provided through a non-temporary reading device such as a CD, a DVD, a hard disk, Blu-Ray, a disk, an USB, a memory card, a ROM and the like, or may be downloaded through a network such as an internet.

The foregoing example embodiments and advantages are merely examples and are not to be construed as limiting the present disclosure. The present teaching can be readily applied to other types of apparatuses. Also, the description of the example embodiments of the present disclosure is intended to be illustrative, and not to limit the scope of the claims, and many alternatives, modifications, and variations will be apparent to those skilled in the art.

What is claimed is:

1. An electronic apparatus configured to perform wireless peer-to-peer (wireless p2p) connection with an external device, the electronic apparatus comprising:
communication circuitry;
a microphone; and
a processor configured to:
in response to receiving a voice command for a wireless p2p connection through the microphone, control the communication circuitry to broadcast a probe request to at least one external device,
in response to receiving a probe response for the probe request from the external device, comparing a first voice data from the voice command and a second voice data from the probe response,
in response to the first voice data being consistent with the second voice data, identify the external device as a target device for the wireless p2p connection, and control the communication circuitry to perform wireless p2p connection with the identified external device,
wherein the probe response includes at least one of an identification information field, a data length field or a data field, and the processor is configured to obtain the second voice data from the data field by using the identification information field and the data length field.

2. The electronic apparatus of claim 1, wherein the probe request includes at least one of an identification information field, data length information or voice data.

3. The electronic apparatus of claim 1, wherein, the processor is configured to control the communication circuitry to sequentially perform a group formation stage and an operation stage with the external device in response to the external device being selected as a target device for the wireless p2p connection.

4. A method for performing wireless peer-to-peer (wireless p2p) connection with an external device, the method comprising:
receiving a voice command;
broadcasting a probe request to at least one external device;
receiving a probe response, for the probe request, from the external device;

comparing a first voice data from the voice command and a second voice data from the probe response;

in response to the first voice data being consistent with the second voice data, identifying the external device as a target device for the wireless p2p connection; and performing the wireless p2p connection with the external device, wherein the probe response includes at least one of an identification information field, a data length field or a data field, and the method comprises obtaining the second voice data from the data field by using the identification information field and the data length field.

5. The method of claim 4, wherein the probe request includes at least one of an identification information field, data length information or voice data.

6. The method of claim 4, further comprising: in response to the external device being selected as a target device for the wireless p2p connection, sequentially performing a group formation stage and an operation stage with the external device.

* * * * *